R. MONCURE.
LOCK FOR DEMOUNTABLE RIMS AND TIRES.
APPLICATION FILED APR. 21, 1921.
1,417,549. Patented May 30, 1922.
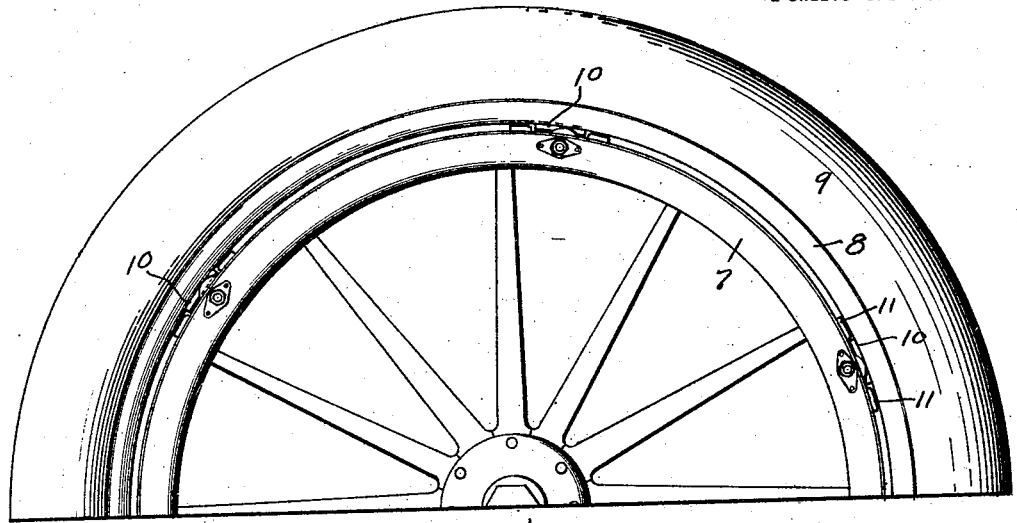
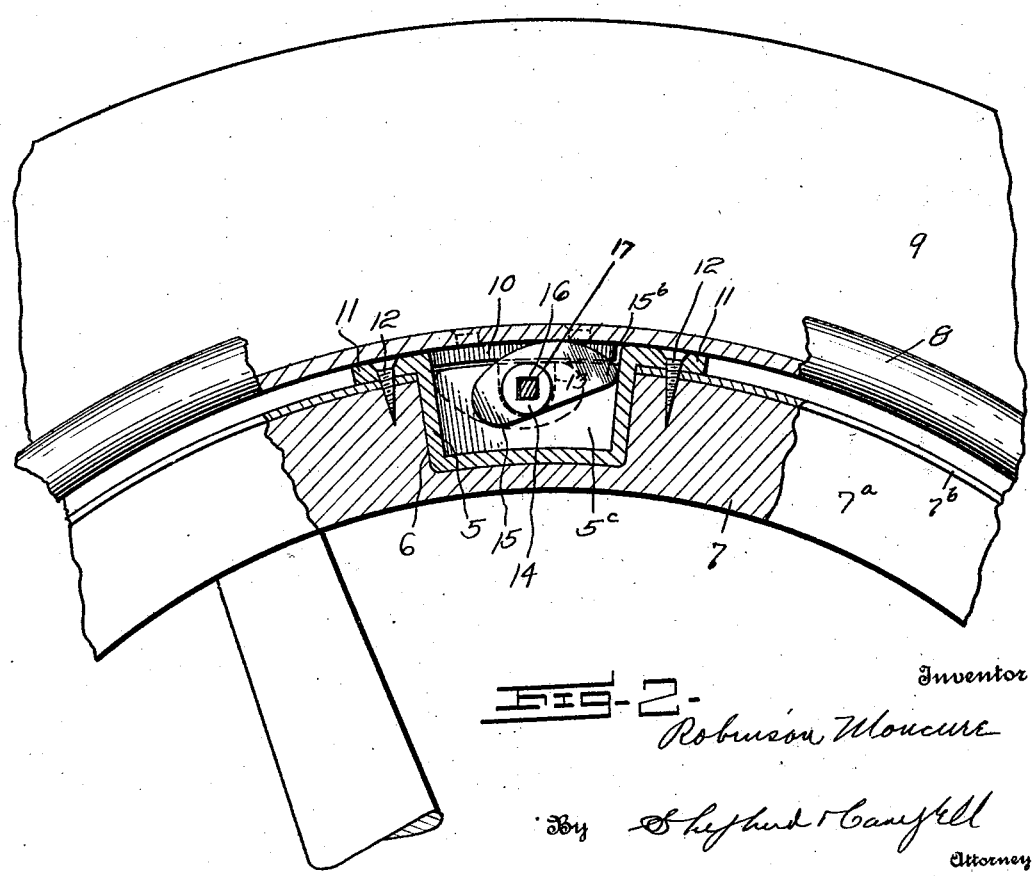
Inventor
Robinson Moncure
By Shepherd & Campbell
Attorneys

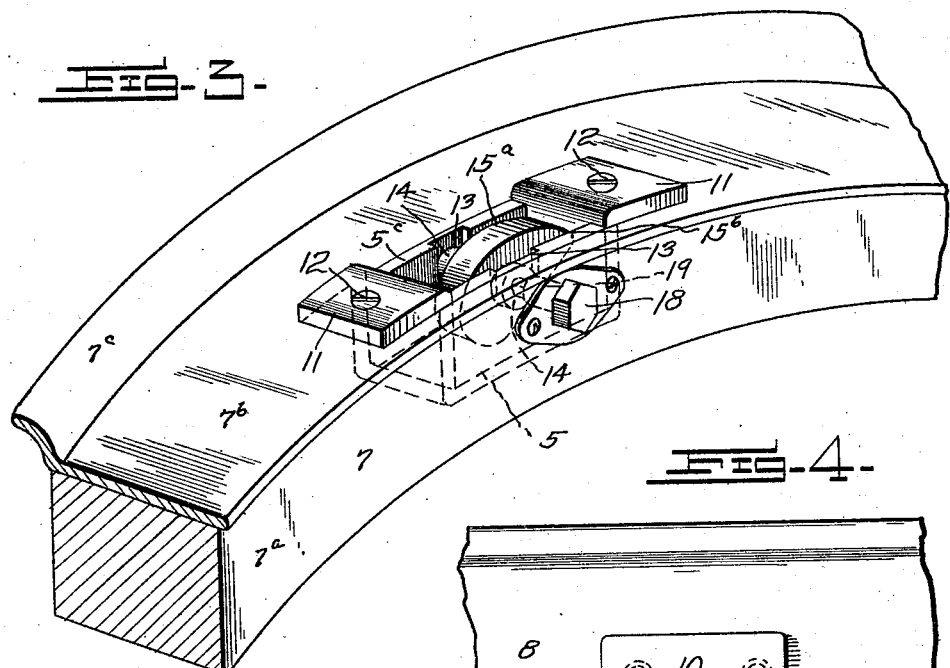
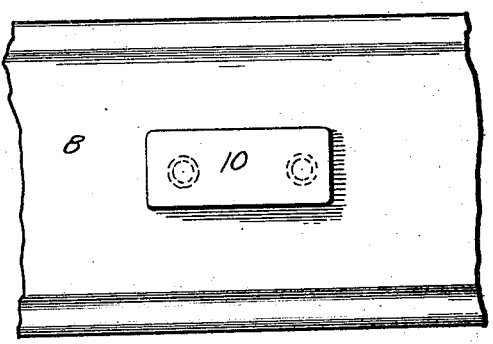
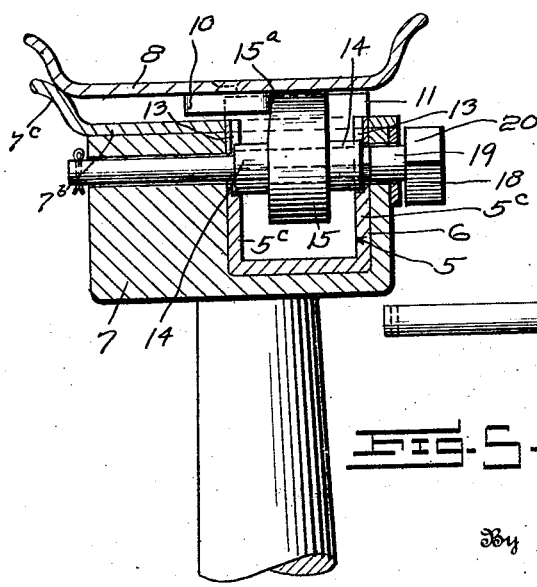
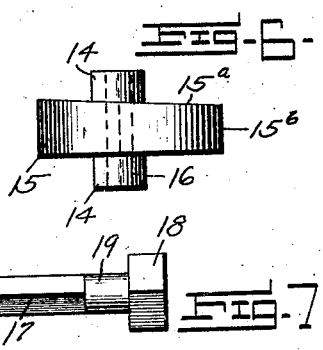

UNITED STATES PATENT OFFICE.

ROBINSON MONCURE, OF ALEXANDRIA, VIRGINIA.

LOCK FOR DEMOUNTABLE RIMS AND TIRES.

1,417,549.  Specification of Letters Patent.  Patented May 30, 1922.

Application filed April 21, 1921. Serial No. 463,110.

*To all whom it may concern:*

Be it known that I, ROBINSON MONCURE, a citizen of the United States, residing at Alexandria, in the county of Arlington and State of Virginia, have invented certain new and useful Improvements in Locks for Demountable Rims and Tires, of which the following is a specification, reference being had therein to the accompanying drawings.

Broadly stated the object of the present invention is to provide a "quick action" lock by means of which a demountable rim and the tire carried thereby may be firmly secured in place upon a wheel with a minimum expenditure of effort upon the part of the person applying the same.

Many important features of novelty and advantage with respect to the location and mounting of the parts, distribution of load, simplicity and economy in construction and the like, will be set forth in the detail description which follows.

In the accompanying drawings:

Fig. 1 is a side elevation of a part of wheel having the invention applied thereto;

Fig. 2 is an enlarged view partly in side elevation and partly in section through one of the locking mechanisms;

Fig. 3 is a sectional perspective view of a portion of the felloe and one of the locking mechanisms;

Fig. 4 is an inside plan view of a part of a demountable rim;

Fig. 5 is a transverse vertical sectional view through one of the locking mechanisms with certain of the parts in elevation;

Fig. 6 is a plan view of one of the cams hereinafter described; and

Fig. 7 is a detail side view of one of the actuating bolts, hereinafter described.

Like numerals designate corresponding parts throughout the several figures of the drawings.

Any suitable number of the locking mechanisms may be employed, though, preferably, six of them are used upon a wheel. Since they are identical in construction, a description of one will serve as a description of all. Each locking mechanism comprises a box like housing 5 having a snug seating in a recess 6 formed in the felloe 7 of the wheel. The felloe comprises the usual wooden portion $7^a$ and carries the usual circumferential metallic felloe band $7^b$, said band being provided with an inclined and outstanding flange $7^c$ along its inner edge, said flange $7^c$ limiting the inward movement of the demountable rim 8 which carries the tire 9 in the usual and well known way.

This device is also equally applicable to a solid metal felloe.

The demountable rim 8 is provided, upon its inner face, with a plurality of lugs or plates 10, which may be separate from but riveted to the rim or may be integral with and struck from the metal of the rim, as desired. The end walls of the housing 5 are out turned and overlie the band $7^b$, these outturned portions constituting abutments 11 between which the plates 10 fit. Thus movement of the rim and tire about the felloe, circumferentially thereof, is effectually prevented. If desired, the housings 5 may be secured to the felloe of the wheel by screws 12. The use of screws at this point is not absolutely necessary. If these housings are made to fit snugly and with a driving fit in the recesses 6, they will be sufficiently secured in place without the employment of the screws.

The side walls $5^c$ of the housings terminate short of the upper surfaces of the abutments 11. In other words the upper edges of the side walls lie substantially flush with the upper face of the felloe band $7^b$ and this permits lateral movement of the plate 10 into position between the abutments 11. Bearing recesses 13 are formed in the side walls $5^c$ in which hub extensions 14 of cams 15 have their bearing. These cams and hubs have openings 16 formed through them, which openings are angular in cross section and receive the correspondingly shaped shanks 17 of bolts having angularly formed heads 18. These bolts preferably have cylindical portions 19, which cylindrical portions lie in openings 20 formed in the felloe 7.

The cams 15 are so shaped as to exert a thrust both radially and laterally. To this end their inner sides $15^a$ are disposed at an angle to their axes as represented by the shanks 17 of the bolts, and these inclined inner faces engage the outer edges of the plates 10 and exert a cam action thereagainst to thrust said plates, and consequently the rim 8, forcibly inward, when the cams are turned from the dotted line position Fig. 2 to the full line position in said figure. Thus it is necessary to give only a partial turn to the bolts by means of a wrench applied to the angular heads 18 thereof and this partial turn not only thrusts the rim inwardly to cause its inner edge 8 to be bound firmly against the flange 7$^c$ of the felloe band 7$^b$, but during such partial turning movement of the bolts and cams, the cams are moved to "past-center" positions. As their elongated nose portions 15$^b$ pass over the center the rim is thrust outwardly against the natural resiliency of the rim and against the natural resiliency of the pneumatic tire mounted thereon, and when the cam comes to its final position of rest in locking position, as illustrated in full lines in Fig. 2, it is still exerting a radial thrust against the inner face of the rim. In other words these cams come to their positions of rests abutting against the right hand end of the housings 5 before the tendency of the rim to move inwardly, under its own elasticity and the elasticity of the tire, ceases.

Since the cams, after reaching their positions of rest, are still under tension exerted by the rim, it follows that these cams will be held securely against retrograde movement and accidental unlocking of the device will be beyond the range of possibility. Additionally, it will be seen that this holding of the cams under continued tension effectually prevents them from rattling or making any other objectionable noise, when the wheel is in use. It will be observed that all of the strain upon the cams is exerted through the hubs 14 upon the side walls 5$^c$ of the housing. This relieves the bolts of all strain. These bolts do not carry any of the weight but have as their whole duty to impart the necessary turning movements to the cams. The importance of thus transmitting the load from the cams to the sidewalls of the housings and relieving the bolts of these strains will be appreciated, when it is remembered that a wheel striking a stone or other obstruction at high speed or dropping suddenly into a depression is subjected to radial thrust of a very severe nature.

The device of the present invention is equally applicable to wheels already in use or those hereafter to be manufactured. This device may be operated without the bolts shown in Fig. 7 by using in lieu thereof any suitably shaped tool adapted to engage the angular openings in the cams.

It is to be understood that the invention is not limited to the precise construction set forth but that it includes within its purview whatever changes fairly come within either the terms or the spirit of the appended claims.

Having described my invention, what I claim is:

1. A rim lock of the character described comprising a housing adapted to be inserted in a recess formed in the face of the felloe of a wheel, a cam mounted in said housing and having hubs upon its opposite sides which have bearing in the side walls of said housing, means for imparting partial rotation to said cam from the exterior of the housing, the said cam being adapted to exert lateral thrust against an inwardly extending projection of a demountable rim.

2. A device of the character described comprising a felloe having a plurality of peripheral recesses formed therein, housings inserted in said recesses, the end walls of which are provided with outturned portions which rest upon the outer face of the felloe and constitute spaced abutments, a rim, projections carried by said rim adapted to enter between said abutments and cams mounted for partial rotation in said housings and shaped to exert both a lateral and radial thrust upon the rim when moved to locking position.

3. In a rim lock, a housing adapted to be seated in a recess in the outer face of the felly of a wheel and having lugs thereon adapted to rest on the outer face of the felly, recesses in the inner side walls of the housing and having bearings at the radially inner ends thereof, a cam having hubs seated in said bearings, the cam and hubs being provided with an angular opening through which an angular manipulating element may be passed transversely of the wheel.

4. A rim lock of the character described comprising a housing adapted to be inserted in a recess formed in the face of the felloe of a wheel, said housing being insertable from the outer side of said recess and the sidewalls of said housing being recessed, a cam mounted in said housing and having hubs upon its opposite sides which have bearing in the said recesses of the sidewalls of the housing, a rim and a projection upon the rim adapted to be engaged by the side of said cam and against which said cam exerts lateral thrust the length of the cam being such as to cause it to exert a radial thrust upon the rim and the length of the housing being such that the cam abuts against the end of the housing and comes to a position of rest while still exerting a radial thrust upon the rim.

In testimony whereof I hereunto affix my signature.

ROBINSON MONCURE.